W. C. D. PAGE & J. L. FAHY.
Instrument for Extracting Corks from Bottles.
No. 164,931.          Patented June 29, 1875.
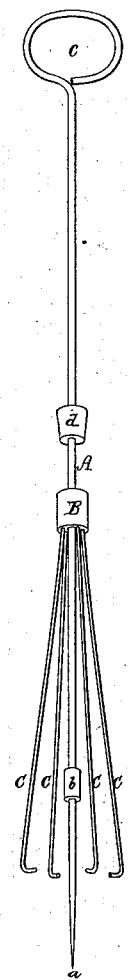

United States Patent Office.

WILLIAM C. D. PAGE AND JOHN L. FAHY, OF EAST CAMBRIDGE, MASS., ASSIGNORS TO JOHN L. FAHY, OF SAME PLACE.

IMPROVEMENT IN INSTRUMENTS FOR EXTRACTING CORKS FROM BOTTLES.

Specification forming part of Letters Patent No. 164,931, dated June 29, 1875; application filed October 22, 1874.

*To all whom it may concern:*

Be it known that we, WILLIAM C. D. PAGE and JOHN L. FAHY, of East Cambridge, of the county of Middlesex and State of Massachusetts, have invented a new and useful Improvement in Bottle-Cork Extractors; and do hereby declare the same to be fully described in the following specification, and represented in the accompanying drawing, which is a perspective view of it.

The invention consists in the combination of a sliding spear provided with a shoulder, with a head, and a set of elastic and hooked prongs extended from such head; also, of the head and series of prongs, in combination with the sliding spear provided with two shoulders or stops, all being substantially as shown in the drawing, in which—

A denotes the spear, pointed at one end, as shown at *a*, provided with a shoulder or stop, *b*, and at its other end bent around in the form of an open eye or head, as shown at *c*. It extends axially and loosely through a cylinder or head, B, having a series of elastic and hooked prongs, C C C, arranged with and extended from it, and formed as represented. Above the head B the spear is provided with another shoulder or stop, *d*, arranged on it, as shown. This shoulder *d* insures the prongs being forced down through the neck of and into the bottle, and saves the necessity of pushing them through the neck by hand. If allowed to be suspended within the neck, the latter, especially in small bottles, will prevent such prongs from expanding sufficiently to catch the cork while being drawn upward by the spear.

On introducing the prongs into the mouth of and down within a bottle the spear is to be used by plunging it into the cork and drawing it between the prongs until the shoulder may be brought up against the head thereof. On continuing to pull in the spear the prongs will close upon and seize the cork, so as to enable it to be drawn out of the bottle.

We are aware that a set of hooked prongs connected to a head provided with arms to rest on the mouth of a bottle has been combined with a sliding spear provided with a sleeve to encompass and slide on and close the prongs, so as to enable them to be introduced into a bottle-neck, they to be supported therein, such being as shown in the United States Patent No. 73,435. Therefore we make no claim to an extractor so made.

We dispense entirely with the sleeve, and also the arms extended from the head of the set of hooked prongs, and we apply to the spear the two shoulders, as described, and thus we produce a cork-extractor that will admit the set of prongs being introdued into the bottle below its neck, and even down to the bottom of the bottle, whereby they may be used to better advantage in grasping a cork, and are left free to expand, their expansion not being liable to be prevented by the neck, as it would be often in case of their being held within it.

We therefore claim—

1. Our improved bottle-cork extractor, substantially as described, consisting of the spear A, shoulders *b d*, head B, and the series of hooked prongs C C C C, arranged and combined as set forth and shown.

2. The combination of the spear A, shoulder *b*, head B, and prongs C, arranged as specified.

WM. C. D. PAGE.
JOHN L. FAHY.

Witnesses:
R. H. EDDY,
J. R. SNOW.